(12) United States Patent
Holzapfel

(10) Patent No.: US 8,804,131 B2
(45) Date of Patent: Aug. 12, 2014

(54) OPTICAL ANGLE-MEASURING DEVICE WITH COMBINED RADIAL-CIRCULAR GRATING

(75) Inventor: Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 446 days.

(21) Appl. No.: 13/288,017

(22) Filed: Nov. 2, 2011

(65) Prior Publication Data

US 2012/0105862 A1 May 3, 2012

Related U.S. Application Data

(60) Provisional application No. 61/409,646, filed on Nov. 3, 2010.

(30) Foreign Application Priority Data

Nov. 3, 2010 (DE) .......................... 10 2010 043 263
Aug. 31, 2011 (DE) .......................... 10 2011 081 879

(51) Int. Cl.
*G01D 5/34* (2006.01)
*G01B 11/02* (2006.01)

(52) U.S. Cl.
USPC ....................................... 356/499; 250/231.16

(58) Field of Classification Search
CPC ........................... G01D 5/3473; G01B 2290/30
USPC ............ 356/499; 250/237 G, 231.16, 231.13
See application file for complete search history.

(56) References Cited

U.S. PATENT DOCUMENTS

| 6,320,609 | B1 | 11/2001 | Buchanan et al. | |
|---|---|---|---|---|
| 7,796,272 | B2 | 9/2010 | Holzapfel | |
| 7,907,286 | B2 | 3/2011 | Holzapfel | |
| 2001/0017350 | A1 | 8/2001 | Ishizuka | |
| 2012/0075622 | A1* | 3/2012 | Nagura | 356/138 |
| 2012/0162646 | A1* | 6/2012 | Holzapfel | 356/369 |

FOREIGN PATENT DOCUMENTS

| EP | 1 353 153 | 10/2003 |
|---|---|---|
| EP | 1 435 510 | 7/2004 |
| EP | 2 233 892 | 9/2010 |
| WO | WO 2008/138501 | 11/2008 |
| WO | WO 2008/138502 | 11/2008 |

OTHER PUBLICATIONS

European Search Report, dated Apr. 9, 2014, issued in corresponding European Patent Application No. 11185150.7.

* cited by examiner

*Primary Examiner* — Hwa Lee
(74) *Attorney, Agent, or Firm* — Kenyon & Kenyon LLP

(57) ABSTRACT

In an optical angle-measuring device for ascertaining the relative movement between at least one scanning grating and a graduated disk having at least one measuring graduation, the scanning grating is in the form of a linear scanning grating, and the graduated disk includes a first and a second combined radial-circular grating as measuring graduation, and has a mirror. An incident beam of rays is initially split at the scanning grating into two partial beams of rays that then propagate in the direction of the first combined radial-circular grating and are diffracted there, then propagate in the direction of the mirror and are reflected there in the direction of the second combined radial-circular grating, subsequently propagate in the direction of the second combined radial-circular grating and are diffracted there, and then propagate in the direction of the scanning grating, where a superposition of the partial beams of rays results.

15 Claims, 14 Drawing Sheets

Fig. 4a  Fig. 4b  Fig. 4c
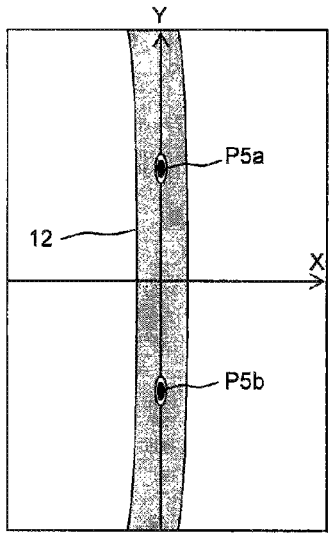
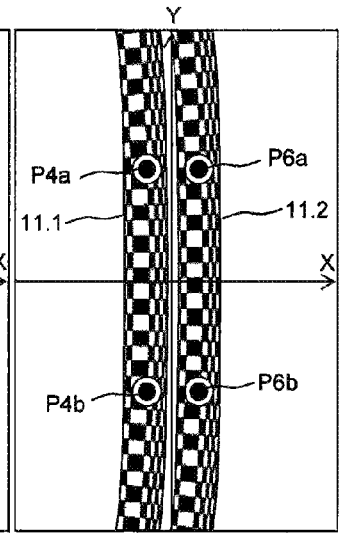
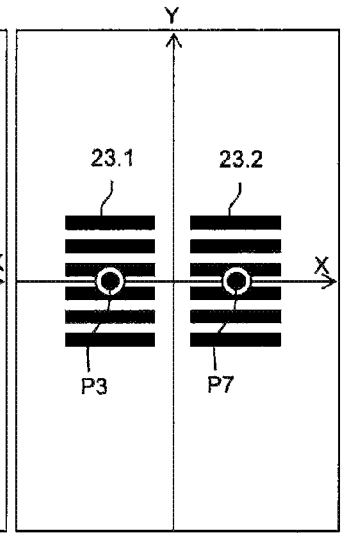
Fig. 5
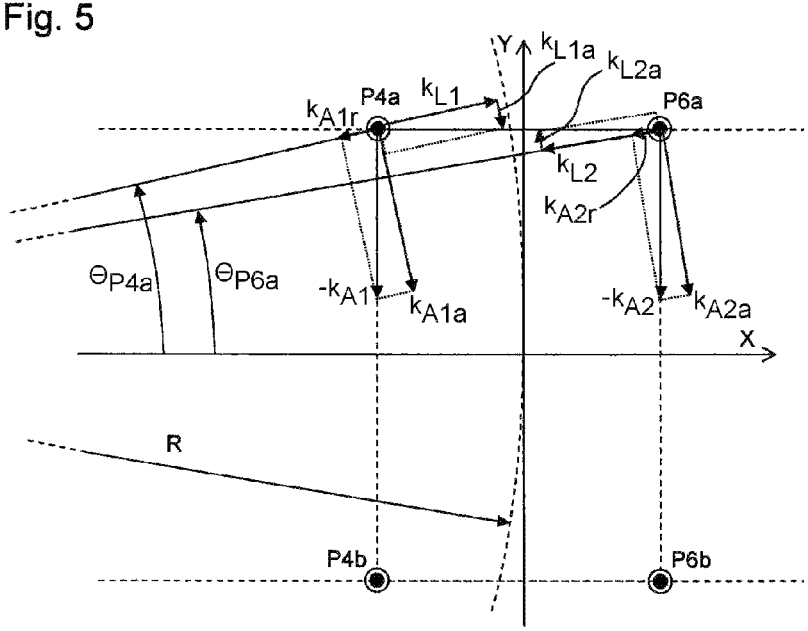

Fig. 8a
Fig. 8b
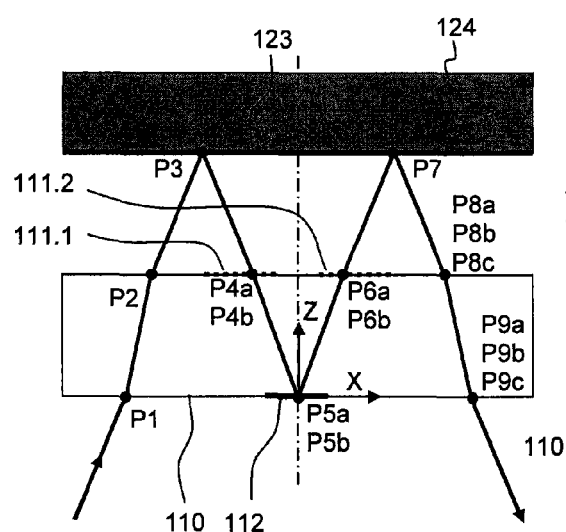
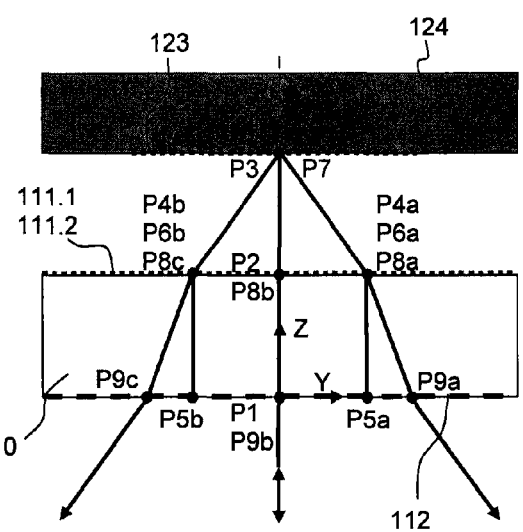

OPTICAL ANGLE-MEASURING DEVICE WITH COMBINED RADIAL-CIRCULAR GRATING

CROSS-REFERENCE TO RELATED APPLICATIONS

The present application claims priority to Application No. 10 2010 043 263.6, filed in the Federal Republic of Germany on Nov. 3, 2010, claims priority to Application No. 10 2011 081 879.0, filed in the Federal Republic of Germany on Aug. 31, 2011, and claims the benefit of U.S. Provisional Patent Application Ser. No. 61/409,646, filed on Nov. 3, 2010, each of which is expressly incorporated herein in its entirety by reference thereto.

FIELD OF THE INVENTION

The present invention relates to an optical angle-measuring device.

BACKGROUND INFORMATION

For the most part, high-resolution optical angle-measuring devices based on interferential scanning principles have only small mounting tolerances for the graduated disk having the measuring graduation disposed on it. A measuring device which addresses this problem is described in German Patent Application No. 10 2010 029 211.7. Wave-front distortions which result from the scanning of radial graduations and are also a cause for the only small mounting tolerances may be minimized by the provided use of retroreflectors and wave-front correctors. However, as a general principle, the wave-front corrector necessary for this purpose must be optimized for a particular graduation radius of the scanned measuring graduation or for a quite specific measuring application. Therefore, the problem results that the corresponding scanning optics of the optical angle-measuring device accordingly cannot be used universally for different graduation radii to be scanned, nor universally for various measuring applications.

SUMMARY

Example embodiments of the present invention provide an optical angle-measuring device having high resolution and improved mounting tolerances which is usable universally in conjunction with different graduation radii of the scanned measuring graduation and in various measuring applications, without necessitating significant adjustments of the scanning optics.

The optical angle-measuring device according to an example embodiment of the present invention may be used to ascertain the relative movement between at least one scanning grating and a graduated disk having at least one measuring graduation. The scanning grating is in the form of a linear scanning grating. The graduated disk includes a first and a second combined radial-circular grating as measuring graduation, and has a mirror. In this manner, an incident beam of rays is initially split at the scanning grating into two partial beams of rays. The partial beams of rays propagate in the direction of the first combined radial-circular grating and are diffracted there. The diffracted partial beams of rays subsequently propagate in the direction of the mirror and are reflected there in the direction of the second combined radial-circular grating. The partial beams of rays then propagate in the direction of the second combined radial-circular grating and are diffracted there. Finally, the diffracted partial beams of rays propagate in the direction of the scanning grating, where a superposition of the partial beams of rays results.

For example, the combined first and second radial-circular gratings may unite at least an azimuthal, optical, deviating effect with the optical effect of a radial, annularly curved cylindrical lens.

In this context, the first combined radial-circular grating may be formed such that, in addition to a longitudinal and a transverse deviating effect on the partial beams of rays, the partial beams of rays are thereby also focused onto the mirror.

The second combined radial-circular grating may be formed such that, via it, in addition to a longitudinal and a transverse deviating effect on the partial beams of rays, the partial beams of rays propagating in the direction of the scanning grating are also re-collimated.

In example embodiments, the combined first and second radial-circular gratings are disposed in a ring shape over the circumference of the graduated disk, and in each case have a constant azimuthal grating period over the ring circumference, and a varying radial grating period in the radial direction.

The mirror may be disposed in a ring shape over the circumference of the graduated disk.

It is possible that the graduated disk is made of transparent material, and the combined first and second radial-circular gratings are disposed on a first side, and on the opposite second side, the mirror is disposed with its reflecting surface oriented in the direction of the first side.

In example embodiments, the scanning grating is in the form of a reflective scanning grating.

A light source as well as a plurality of optoelectronic detector elements may be provided in a scanning unit, the beam of rays emitted by the light source being able to be routed to the scanning grating, and the superposed partial beams of rays being able to be routed to the optoelectronic detector elements.

In example embodiments, the scanning grating is further arranged in the scanning unit, and the graduated disk is moveably disposed relative to the scanning unit.

Alternatively, at least one scanning unit may be displaceably disposed relative to the scanning grating, and the graduated disk may be rotatable.

At least one scanning unit, together with the scanning grating, may be arranged in a manner allowing movement relative to the graduated disk along an axis that extends through the center of the graduated disk.

It is further possible to provide a plurality of scanning units and a plurality of scanning gratings assigned to the scanning units, the scanning units and scanning gratings being placed at various azimuthal positions relative to the graduated disk.

Moreover, the graduated disk may be include a plurality of graduated-disk segments.

It may also be provided that the beams of rays coming from the scanning unit are guidable via a deviating unit in the direction of the graduated disk, and the beams of rays coming from the graduated disk are guidable via the deviating unit in the direction of the scanning unit.

The optical angle-measuring device is suitable for the high-resolution, universal scanning of curved measuring graduations having different graduation radii, without in each case having to adapt the scanning optics for that purpose. In principle, the scanning optics of the angle-measuring device may be used to scan a linear measuring graduation.

Furthermore, the optical angle-measuring device may be employed both in customary applications for determining angle of rotation, as well as for determining position in special machine kinematics, which are described in more detail below. That is, the optical angle-measuring device is also usable universally with regard to widely-varying applications. Thus, for instance, using it, it is possible to determine with great accuracy the rotational angle of a rotary table that is disposed on a linear table in a manner allowing it to shift along a lateral direction. At the same time, in so doing, the guideway deviations or guideway errors of the linear table are determined, as well. Moreover, in such kinematics, besides determining the rotational angle, the optical angle-measuring device also makes it possible to determine the lateral XY-position of the displaceable rotary table. In contrast to conventional systems, the determination of the rotational angle and the optional determination of the lateral XY-position, i.e., determination of the combined rotational and linear movement, takes place not sequentially, but rather directly and with small measuring circle.

As further advantages of the optical angle-measuring device described herein, it should be mentioned that, besides having a possible high resolution, at the same time, it additionally has improved mounting tolerances for the graduated disk, accompanied by a relatively large scanning area on the part of the measuring graduation.

Further features and aspects of example embodiments of the present invention are described in more detail below with reference to the appended Figures.

BRIEF DESCRIPTION OF THE DRAWINGS

FIG. 4a is a partial view of the lower side of the graduated disk from the optical angle-measuring device illustrated in FIGS. 2a and 2b, with the mirror disposed on it.

FIG. 4b is a partial view of the upper side of the graduated disk from the optical angle-measuring device illustrated in FIGS. 2a and 2b, with the radial-circular gratings disposed on it FIG. 4c is a partial view of the scanning gratings of the optical angle-measuring device illustrated in FIGS. 2a and 2b.

FIG. 5 illustrates dimensioning of the radial-circular gratings of the optical angle-measuring device.

FIGS. 8a and 8b are sectional views showing the scanning beam path of the optical angle-measuring device illustrated in FIGS. 6 and 7.

DETAILED DESCRIPTION

Figure 1:
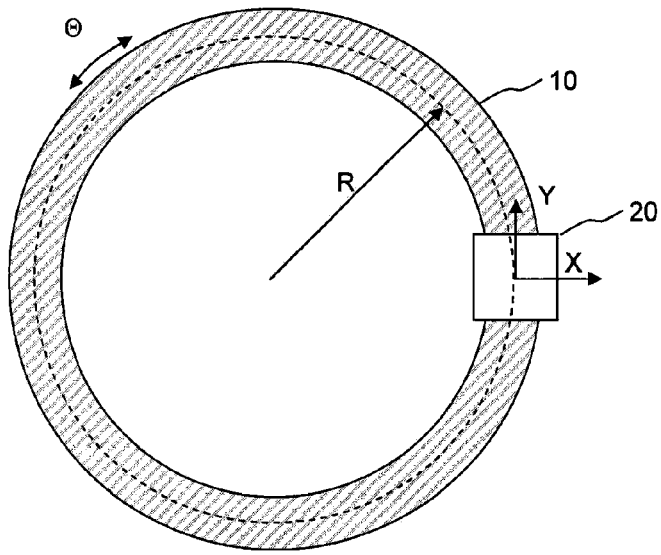
FIG. 1 is a schematic view of components of the optical angle-measuring device according to an example embodiment of the present invention, including various geometrical quantities.

Before various exemplary embodiments and application examples of the optical angle-measuring device are explained below in detail, certain basic considerations will first be clarified, with reference to FIG. 1. Furthermore, individual geometrical quantities are illustrated in FIG. 1, which will be discussed during the further course of the description.

The optical angle-measuring device according to an example embodiment of the present invention is based on an interferential scanning principle and includes a scanning unit 20, as well as a graduated disk 10, rotating relative to it in the XY-plane, having at least one measuring graduation disposed on it. The measuring graduation is not shown in FIG. 1. To determine the rotational angle $\Theta$ of graduated disk 10 relative to scanning unit 20, a radial grating is provided as measuring graduation on graduated disk 10. The radial grating distorts the wave fronts of the diffracted beams of rays in the scanning beam path. Therefore, correcting scanning gratings are needed in scanning unit 20 in order to bring the two partial beams of rays to interference and to generate scanning signals having a high modulation factor. If great assembly tolerances and operating tolerances with respect to the relative position of graduated disk 10 and scanning unit 20 are desired, in principle, it is possible to dispose additional retroreflection elements and wave-front correctors in the scanning beam path in the scanning unit. For this, reference is made, for example, to German Patent Application No. 10 2010 029 211.7, which is expressly incorporated herein in its entirety by reference thereto. In this connection, in general, a special adaptation of the optical elements of scanning unit 20 to graduation radius R of the measuring graduation of graduated disk 10 is necessary.

Example embodiments of the present invention provide scanning optics which implement the function of the retroreflection elements and the wave-front correctors described in German Published Patent Application No. 10 2010 029 211.7 in a measuring graduation, formed as a combined radial-circular grating on graduated disk 10. Only a linear grating is necessary as scanning grating in scanning unit 20. In this manner, one and the same scanning unit 20 may be used to scan various graduated disks 10 having different graduation radii R of the measuring graduation disposed on them. Moreover, because of the linear scanning grating, it is possible to use scanning unit 20 of the optical angle-measuring device to scan a measuring standard having a linear measuring graduation (R→∞), as well. A measuring standard suitable for this purpose is described, for example, in PCT International Published Patent Application No. WO 2008/138502, which is expressly incorporated herein in its entirety by reference thereto.

Since the scanning grating is in the form of a linear grating, a lateral shift of this scanning grating has no influence on the signal strength of the scanning signals, therefore, it may also be disposed spatially separate from scanning unit 20, and may be enlarged as needed in its longitudinal or transverse dimension. That is to say, the relative movement between the scanning grating and a graduated disk having the measuring graduation disposed on it, i.e., between the machine components joined to the scanning grating and the graduated disk, is therefore determinable using the angle-measuring device hereof. In this manner, example embodiments of the optical angle-measuring device, it is possible to perform an angle measurement even in the case of a large lateral XY-shift of the graduated disk relative to the scanning grating. The permissible lateral XY-shift is limited only by the size of the scanning grating, if scanning unit 20 is co-shifted, but not co-rotated with graduated disk 10. The signal strength of the scanning signals is constantly high within this area. Therefore, this example embodiment of the optical angle-measuring device is particularly suitable for machines having special kinematics mentioned above. By the placement of a plurality of scanning units and possibly also a plurality of scanning gratings, the simultaneous determination of the lateral XY-shift is possible, as well.

Figures 2A, 2B:
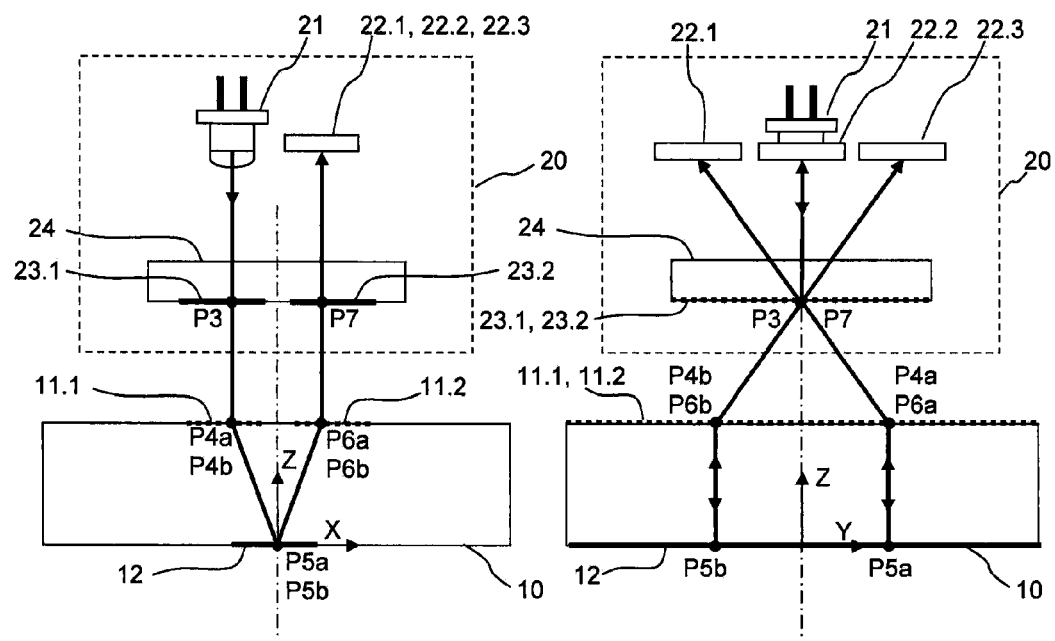
FIGS. 2a and 2b are sectional views illustrating the scanning beam path of an optical angle-measuring device according to an example embodiment of the present invention.

FIGS. 2a and 2b are sectional views illustrating the scanning beam path of a optical angle-measuring device.

A collimated light source 21, e.g., a suitable laser light source, disposed in scanning unit 20 illuminates a first linear scanning grating 23.1 along optical axis Z, the linear scanning grating being applied on the lower side of a scanning plate 24. In this context, the lower side of scanning plate 24 is understood to be that side of scanning plate 24 which is facing scanned graduated disk 10. The opposite side of the scanning plate is denoted as the upper side. The incident beam of rays is split into two partial beams of rays at location P3 of scanning plate 24. Both partial beams of rays then propagate in the direction of a first part of the measuring graduation, which is formed as first combined radial-circular grating 11.1 and is situated on the front side of graduated disk 10. The partial beams of rays strike first combined radial-circular grating 11.1 at locations P4a and P4b, respectively.

First combined radial-circular grating 11.1 is disposed annularly over the circumference of graduated disk 10, and is in the form of a transmitted-light grating. Several optical functions are combined. For example, it guides the two partial beams of rays striking it in the YZ-plane, in a direction parallel to optical axis Z (longitudinal deviating effect) again, and deviates them in the X-direction (transverse deviating effect). Moreover, it focuses the two incident partial beams of rays by a radial cylindrical-lens effect in the radial direction onto a mirror 12, which is located on the back side of transparent graduated disk 10. The mirror is disposed annularly over the circumference of graduated disk 10, as illustrated in the partial view of FIG. 4a.

The partial beams of rays, diffracted by first combined radial-circular grating 11.1 or influenced as first explained, thus propagate in the direction of mirror 12, and there, are reflected at locations P5a and P5b, respectively, on mirror 12 in the direction of a second part of the measuring graduation, i.e., to a second combined radial-circular grating 11.2 on graduated disk 10. After being reflected at locations P5a and P5b on mirror 12, the partial beams of rays therefore propagate in the direction of second combined radial-circular grating 11.2 on graduated disk 10.

Second combined radial-circular grating 11.2 also unites several optical functions. It deviates the partial beams of rays falling on it in the YZ-plane in the opposite direction again (longitudinal deviating effect), so that they strike second scanning grating 23.2 of scanning plate 24 at common location P7. In addition, the two partial beams of rays in the XZ-plane are again directed parallel to optical axis Z (transverse deviating effect). Moreover, the two partial beams of rays are re-collimated via an optical cylindrical-lens effect.

In this example embodiment, graduated disk 10 is made of a transparent material. The combined first and second radial-circular gratings are disposed on a first side (upper side) of graduated disk 10. A mirror 12 is situated on the opposite second side (lower side) of graduated disk 10, with its reflecting surface oriented in the direction of the first side.

After being diffracted or influenced at second combined radial-circular grating 11.2, the partial beams of rays propagate in the direction of linear scanning grating 23.3, where they are superposed or brought to interference and are split into three, in each case combined, partial beams of rays. The three combined partial beams of rays exit scanning grating 23.2 in resulting zeroth and ±1st order of diffraction and arrive at optoelectronic detector elements 22.1, 22.2 and 22.3 in scanning unit 20, which deliver scanning signals modulated as a function of displacement. Due to a special form of second linear scanning grating 23.2, the scanning signals may in each instance be phase-shifted by 120° relative to each other. To that end, it is formed, e.g., in a conventional manner, as a phase grating whose bar height is selected in accordance with a phase shift unequal to 180°, and whose bar widths deviate from the half grating period. The scanning signals are subsequently fed to evaluation units which generate position values from them.

Therefore, in this exemplary embodiment, besides light source 21 and optoelectronic detector elements 22.1, 22.2, 22.3, linear scanning gratings 23.1, 23.2 are also provided in scanning unit 20. The beam of rays emitted by light source 21 is able to be routed to first scanning grating 23.1. The superposed partial beams of rays are able to be routed from second scanning grating 23.2 to optoelectronic detector elements 22.1, 22.2, 22.3. Graduated disk 10 is disposed in a manner allowing movement relative to scanning unit 20, e.g., is rotatable about the central axis of graduated disk 10, which extends parallel to optical axis Z through the midpoint of graduated disk 10.

Figure 3A:
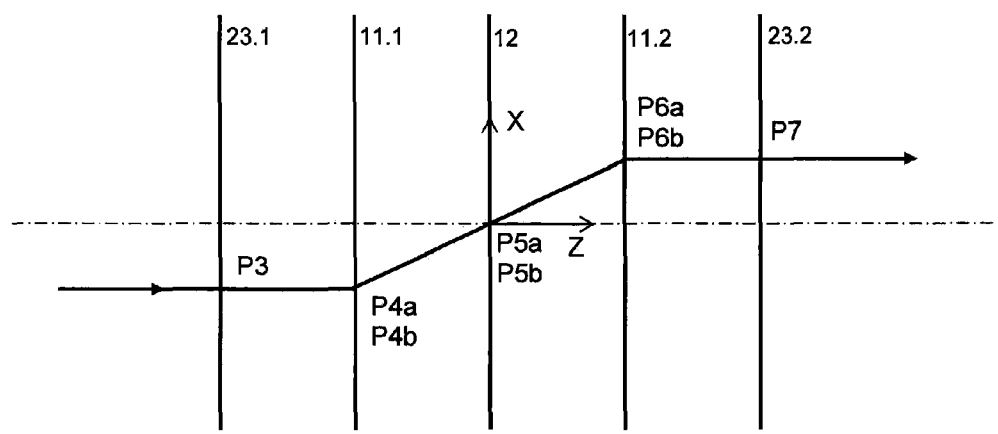
FIGS. 3a and 3b illustrate the unfolded scanning beam path of the optical angle-measuring device illustrated in FIGS. 2a and 2b.
Figure 3B:
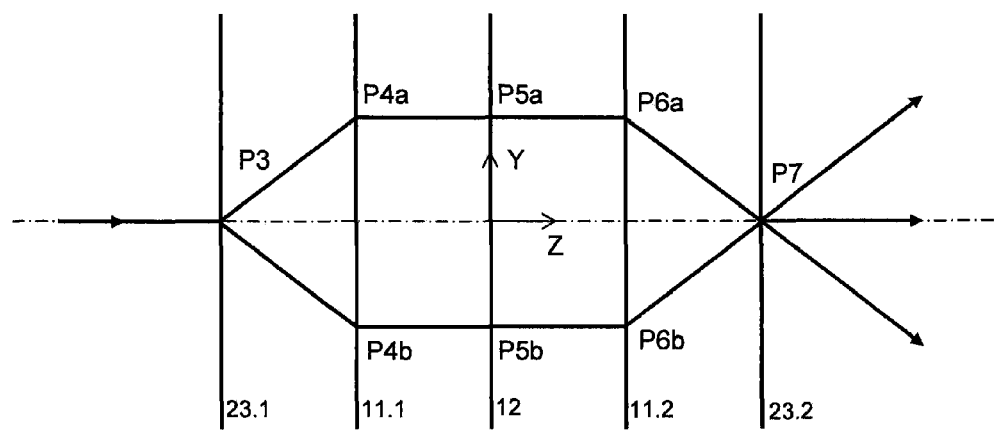

In FIGS. 3a and 3b, the scanning beam path of this exemplary embodiment in shown in stretched or unfolded form. FIG. 3a illustrates the transverse deviating effect of combined radial-circular gratings 11.1 and 11.2 at locations P4a, P4b and P6a, P6b, which results in a beam displacement for the partial beams of rays in the X-direction. FIG. 3b shows the splitting via first scanning grating 23.1 into two partial beams of rays at location P3, the longitudinal deviating effect via combined radial-circular gratings 11.1 and 11.2 at locations P4a, P4b and P6a, P6b, as well as the superposition of the two partial beams of rays at location P7 of second scanning grating 23.2.

FIG. 4a shows a plan view or partial view of annularly curved mirror 12 on the lower side of graduated disk 10 and the two partial beams of rays which, linearly focused by the cylindrical-lens effect of combined radial-circular grating 11.1, are reflected at locations P5a and P5b.

FIG. 4b shows annular, combined radial-circular gratings 11.1 and 11.2 on the upper side of graduated disk 10 in a schematic partial view. The locally checkered structure of these gratings 11.1, 11.2 may be in the form of a phase grating having a phase height of 180°. In the azimuthal direction, i.e., along the ring shape, it is structured periodically like a radial grating. Accordingly, grating 11.1 has $N_1$ azimuthal grating periods and grating 11.2 has $N_2$ azimuthal grating periods over the circumference. In the radial direction, the grating structure corresponds to that of a diffractive, annularly curved cylindrical lens. Therefore, it may be regarded as a circular grating, whose radial grating period varies radially accordingly.

FIG. 4c is a partial view of the two linear scanning gratings 23.1 and 23.2 on the lower side of scanning plate 24. In this example embodiment, both scanning gratings 23.1, 23.2 have the same grating constant and grating orientation. The special form of scanning grating 23.2 was already described above. Scanning grating 23.1 may be in the form of a phase grating having a 180° maximum phase-angle deviation and bar widths nearly equal to half the grating constant. In principle, it is also possible to select the same grating structure for scanning grating 23.1 as for scanning grating 23.2, so that both scanning gratings may also be implemented as common scanning grating.

In the following, the special dimensioning of combined first and second radial-circular gratings 11.1 and 11.2 is explained in greater detail with reference to FIG. 5. To that end, the X- and Y-components of the k-vectors of the two partial beams of rays are considered. Due to the diffraction at linear scanning grating 23.1 having grating constant dA, the partial beam of rays arriving at location P4a has a k-vector $k_{A1}$, where $$k_{A1} = \begin{pmatrix} 0 \\ \frac{2\pi}{d_{A1}} \end{pmatrix}$$ (equation 1)

This k-vector is initially to be offset by a first deviating function, that is, by a grating vector $-k_{A1}$ of combined radial-circular grating 11.1. To that end, this grating vector $-k_{A1}$ is split into a radial component $k_{A1r}$ and an azimuthal component $k_{A1a}$. Radial component $k_{A1r}$ may be attained by a corresponding radial grating constant, and azimuthal component $k_{A1a}$ may be attained by a corresponding azimuthal grating constant. The first deviating function alone would direct the incoming partial beam of rays parallel to optical axis Z. Superimposed on it is a radial cylindrical-lens effect, which is described by a corresponding grating phase $\Phi_L(r)$ according to the following equation:

$$\Phi_L(r) = -\frac{2\pi}{\lambda} \cdot n_T \cdot \sqrt{(r-R)^2 + \Delta a^2 + z_T^2}$$ (equation 2)

where:
λ represents the wavelength of the laser light source;
$n_T$ represents is the refractive index of the graduated disk;
R represents the graduation radius of the graduated disk;
Δa represents the azimuthal shift of the focus location (see below); and
$z_T$ represents the thickness of the graduated disk.

The focus location of this cylindrical lens lies on graduation radius R. Due to the distance of impact point P4a from graduation radius R, this cylindrical lens deviates the partial beam of rays radially. The associated grating vector of this deviation is denoted by $k_{L1}$:

$$k_{L1} = \nabla \Phi_L(r_{P4a})$$ (equation 3)

where $r_{P4a}$ represents the radius of impact location P4a.

If, as in this exemplary embodiment, the cylindrical-lens effect is only intended to produce a deviation in the X-direction, then the Y-component of grating vector $k_{L1}$ must be offset by a corresponding azimuthal grating vector $k_{L1a}$. This azimuthal grating vector $k_{L1a}$ yields a corresponding azimuthal shift Δa of the focus location. In order to optimize the imaging quality of the cylindrical lens, this azimuthal shift Δa should be taken into account in grating phase $\Phi_L(r)$ according to the equation above.

The structure of combined radial-circular grating 11.1 is yielded from the superposition of all azimuthal and radial deviating effects and the cylindrical-lens effect. Resulting azimuthal grating vector $k_{A1a} + k_{L1a}$ may be converted into an azimuthal number of periods N1 over the circumference:

$$N1 = \text{round}((k_{A1a} + k_{L1a}) \cdot r_{P4a})$$ (equation 4)

The error due to the rounding function round may be disregarded. The associated azimuthal grating phase $\Phi_{1a}(\Theta)$ is given by:

$$\Phi_{1a}(\Theta) = N_1 \cdot \Theta$$ (equation 5)

With radial grating vector $k_{A1r}$, which describes the radial deviating effect, and grating phase $\Phi_L(r)$ for the cylindrical-lens effect, radial grating phase $\Phi_{1r}(r)$ is obtained:

$$\Phi_{1r}(r) = \Phi_L(r) + k_{A1r} \cdot r$$ (equation 6)

By quantizing these grating phases, a corresponding phase-grating structure of combined radial-circular grating 11.1 may be calculated. For example, for a binary grating structure, the quantization may be accomplished by providing the grating bars at all locations with:

$$\cos(\Phi_{1r}(r)) \cdot \cos(\Phi_{1a}(\Theta)) > 0$$ (equation 7)

and correspondingly, gaps at all other locations. Other quantization rules are possible, as well. Ultimately, the local periodicity of the grating structure must be given by the periodicity of the functions $\cos(\Phi_{1r}(r))$ and $\cos(\Phi_{1a}(\Theta))$. Especially large scanning signals may be achieved if radial grating phase $\Phi_{1r}(r)$ is approximated by a blazed grating structure.

The structure of combined radial-circular grating 11.2 may be calculated in analogous fashion. The cylindrical-lens effect is described by the same grating phase $\Phi_L(r)$. Its radial deviation is described by grating vector $k_{L2}$:

$$k_{L2} = \nabla \Phi_L(r_{P6a})$$ (equation 8)

where $r_{P6a}$ represents the radius of impact location P6a.

If the cylindrical-lens effect is again only intended to produce a deviation in the X-direction, then the azimuthal component must be offset by a corresponding azimuthal grating vector $k_{L2a}$. Due to the combined effect of azimuthal grating vector $k_{L2a}$ and grating phase $\Phi_L(r)$, the incident partial beam of rays is again collimated and directed parallel to optical axis Z. The further deviating of the partial beam of rays must be accomplished such that the two partial beams of rays may be superposed by second scanning grating 23.2 having grating vector $k_{A2}$. The associated grating vector of this deviation must therefore be $-k_{A2}$. In this example embodiment, both scanning gratings 23.1 and 23.2 have the same grating constant, so that $k_{A2}=k_{A1}$ applies. Grating vector $-k_{A2}$ is again split into an azimuthal component $k_{A2a}$ and a radial component $k_{A2r}$. Analogous to above, an azimuthal number N2 of periods therefore results for second combined radial-circular graduation 11.2, as well as an azimuthal grating phase $\Phi_{2a}(\Theta)$ and a radial grating phase $\Phi_{2r}(r)$, where:

$$N2=\text{round}((k_{A2a}+k_{L2a}) \cdot r_{P6a}) \quad \text{(equation 9)}$$

$$\Phi_{2a}(\Theta)=N_2 \cdot \Theta \quad \text{(equation 10)}$$

$$\Phi_{2r}(r)=\Phi_L(r)+k_{A2r} \cdot r \quad \text{(equation 11)}$$

A quantization of these grating phases is again necessary for calculating the grating structure, and is accomplished as described above.

The second partial beam of rays, which strikes first combined radial-circular grating 11.1 at location P4b and strikes second combined radial-circular grating 11.2 at location P6b, must also be transmitted symmetrically with respect to the first partial beam of rays. Therefore, the azimuthal grating period must have a radial axis of symmetry. The quantization described above supplies such a radial axis of symmetry automatically.

Grating vectors $k_{A1}$ and $k_{A2}$ of the two scanning gratings 23.1 and 23.2 may also be selected to be different. That calls for grating structures of combined radial-circular gratings 11.1, 11.2 suitably adapted according to the equations above. If the grating vectors are selected to be very sharply different, then a beam displacement should also be implemented in the Y-direction between impact locations P4a and P6a or P4b and P6b such that both partial beams of rays coincide again at the same location P7. Azimuthal grating vectors $k_{L1a}$ and $k_{L2a}$ must then be adapted accordingly, which is readily possible for one skilled in the art.

The imaging quality of both cylindrical-lens effects may be improved by an optimization with the aid of a ray-tracing model. Thus, model parameters such as Δa and focus radius R may be optimized differently for both cylindrical-lens effects.

Initially, the above calculation of the various optical deviating effects and cylindrical-lens effects takes into account only the principal rays of the partial beams of rays. However, in practice, wave-front deformations across the lateral extension of the beams of rays determine the usability of a scanning optical system. Evaluable scanning signals with good modulation factor are generated only if these wave-front deformations are extremely small. The fact that these wave-front deformations are actually extremely small is because of two special features of the scanning optics described herein. First of all, the two combined radial-circular gratings 11.1 and 11.2 convert the incident plane wave fronts into plane wave fronts again. This surprising characteristic is connected with the imaging through their radial cylindrical-lens effects, which yields an image scale of −1. The smaller azimuthal grating period on the inner side (toward the smaller radius) of grating 11.1 is thereby imaged onto the outer side of grating 11.2, where the azimuthal grating period is correspondingly larger. Conversely, the larger azimuthal grating period on the outer side of grating 11.1 is imaged onto the inner side of grating 11.2, which has a smaller azimuthal grating period. The radially varying azimuthal deviating effect of first grating 11.1 is offset by imaging and the radially varying azimuthal deviating effect of second grating 11.2. Therefore, an azimuthal deviating effect results which approximately, is no longer a function of radius R. A collimated partial beam of rays is thereby transferred into such a one again. The retroreflection, which is produced by the cylindrical-lens effects in the radial direction with an image scale of −1, and the wave-front correction are therefore accomplished by gratings 11.1 and 11.2 of the graduated disk itself, and not by corresponding optical elements of scanning unit 20, as described in German Patent Application No. 10 2010 029 211.7.

The use of linear scanning gratings 23.1 and 23.2 instead of the radial scanning gratings otherwise customary in angle-measuring devices represents another particularly advantageous feature of the angle-measuring device described herein. Consequently, the wave fronts of the partial beams of rays are plane during the propagation from scanning unit 20 to graduated disk 10, and these plane wave fronts are retained, even in the event of changes in the scanning distance. This holds true for the propagation from graduated disk 10 back to scanning unit 20, as well. The scanning optics thereby allow particularly great tolerances with respect to the scanning distance. This is in contrast to conventional scanning optics, in which during propagation from the scanning unit to the graduated disk or during the propagation back, the partial beams of rays have distorted wave fronts which are not plane. Since the wave-front distortion changes during the propagation, these conventional scanning optics are substantially more sensitive with respect to changes in the scanning distance. The corresponding mounting tolerances are small.

The number of signal periods $N_{SP}$ of the angle-measuring device over a full 360°-rotation is determined by the numbers N1 and N2 of azimuthal periods:

$$N_{SP}=2 \cdot N_1 \cdot N_2 \quad \text{(equation 12)}$$

Further variants of the scanning optics may also be produced by an (also unequal) twisting of the grating directions of the two linear scanning gratings 23.1 and 23.2. Nevertheless, the associated combined radial-circular gratings 11.1 and 11.2 may be calculated according to the equations above.

Besides the universal scanning of measuring graduations having different graduation radii, the angle-measuring device may also be used in applications having special machine kinematics. Such machine kinematics and the resulting demands with respect to the ascertainment of position are explained briefly in the following.

For example, precision machines often require that an object be positioned relative to a tool or a sensor in a plane. To that end, usually a table is used which is displaceable in an X-direction and in a Y-direction, and bears either the object, or the tool or sensor. In addition, the object must be rotated with the aid of a rotary table, and furthermore, must be shifted linearly by a linear table. Such a machine design, i.e., such kinematics are described, for example, in U.S. Pat. No. 6,320,609, and are also denoted hereinafter as polar-coordinate kinematics.

In such kinematics, the constant rotary motion leads to constant acceleration forces, and therefore to constant deformations, which are able to be calibrated. However, for stringent accuracy requirements, until now, there has been no suitable measuring equipment for determining the relative position of object and tool or object and sensor.

Up to now, two position-measuring devices, usually in the form of optical position-measuring devices, have been used in such polar-coordinate kinematics. In this context, the position of the linear table is determined with the aid of a linear position-measuring device. The rotational angle of the rotary table mounted on the linear table is ascertained by an angle-measuring device. The position measurement and angle measurement are usually carried out sequentially. The measuring circle is therefore correspondingly large and drift-sensitive. In addition, control deviations of the linear table and the rotary table are not ascertained. Consequently, the accuracy obtainable using such a measuring system is very limited. In addition to the customary applications ascertaining rotational angle, the optical angle-measuring device according to example embodiments of the present invention is usable in machine designs of this sort for ascertaining position, as well.

Figure 6:
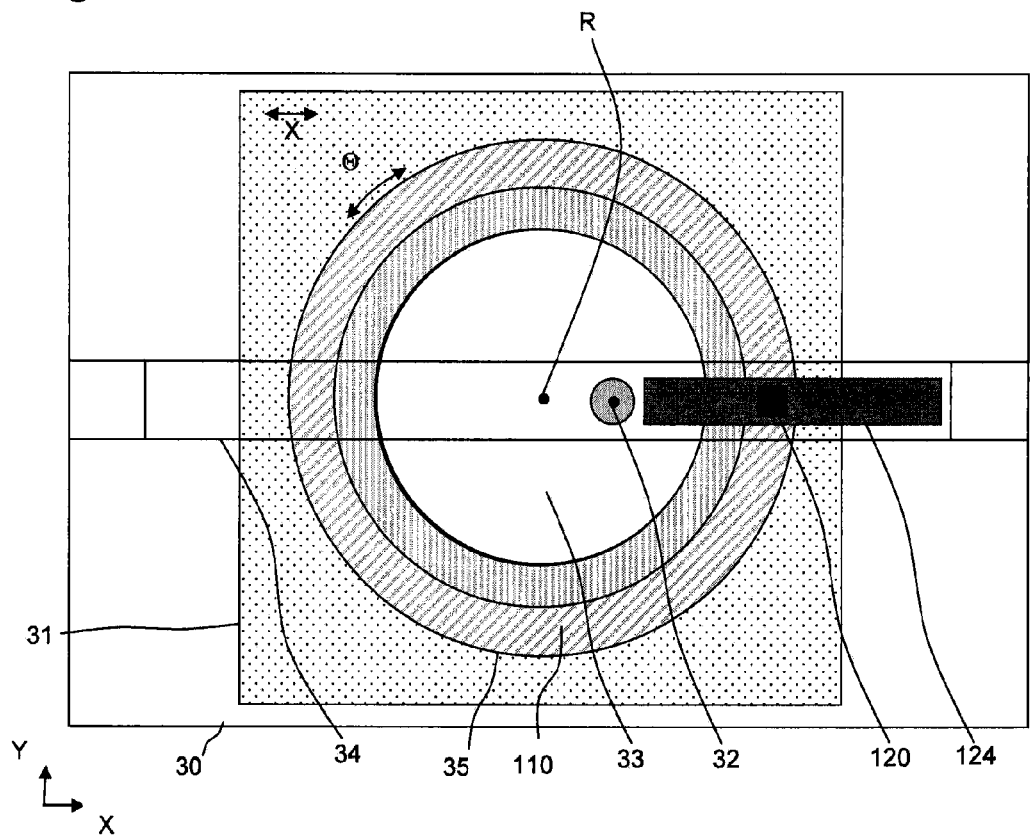
FIGS. 6 and 7 illustrate a machine having polar-coordinate kinematics, in which an optical angle-measuring device according to an example embodiment of the present invention is used.
Figure 7:
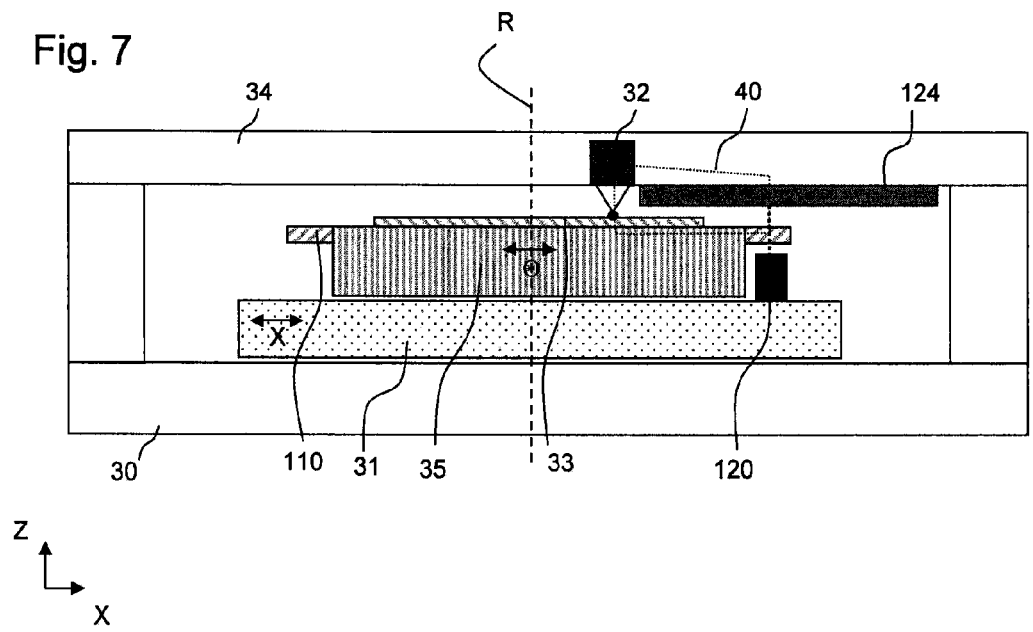
Figure 9A:
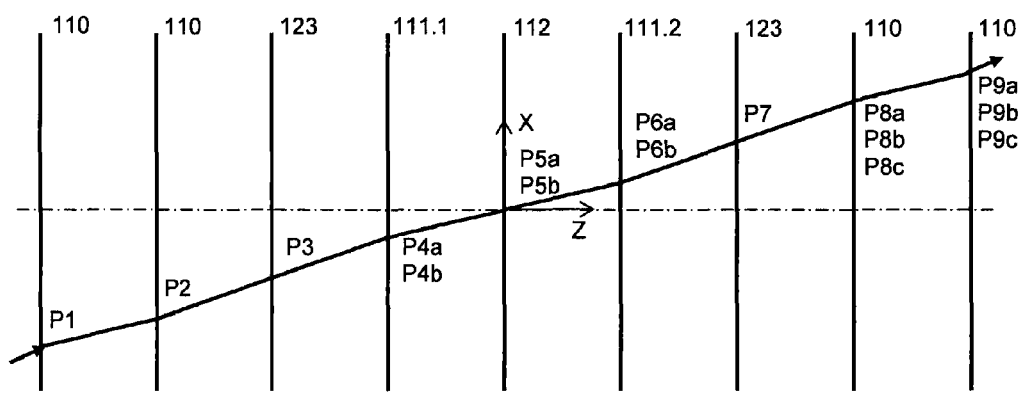
FIGS. 9a and 9b show the unfolded scanning beam path of the optical angle-measuring device illustrated in FIGS. 6 and 7.
Figure 9B:
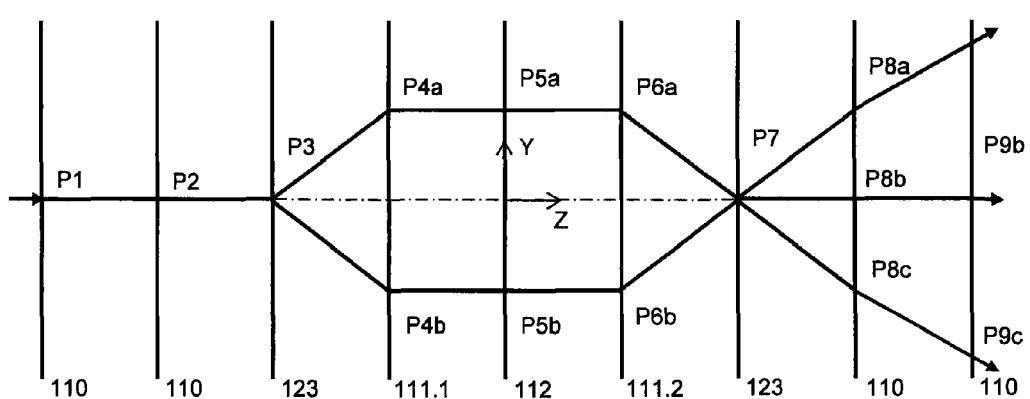

FIGS. 6 and 7 show, schematically, a machine having the aforementioned polar-coordinate kinematics, in which an optical angle-measuring device according to an example embodiment of the present invention is incorporated. It is clarified with reference to FIGS. 8a, 8b, 9a, 9b and 10a, 10b, analogous to the representations from the above-described exemplary embodiment.

Both in the case of the present exemplary embodiment and in the following exemplary embodiments, in each instance, only the decisive differences relative to the previously described first exemplary embodiment or the other exemplary embodiments are explained.

Disposed on a stationary machine base 30 is a linear table 31, which is displaceable along the X-direction. Neither the guide elements nor the driving elements necessary for this are shown in the figures. Mounted on linear table 31 is a rotary table 35, which is rotatable about a central axis of rotation R. Rotary table 35, together with an object 33, may be moved spirally relative to a stationary sensor 32, e.g., a microscope, by a superposed linear motion and rotary motion. In addition to sensor 32, a scanning plate 124 having a linear scanning grating 123 is also mounted on a stationary bridging 34, which is joined to machine base 30. A graduated disk 110 having a measuring graduation is disposed on rotary table 35, adjacent to object 33. At the point of intersection of graduated disk 110 and scanning plate 124, a scanning unit 120 scans the two graduations located thereon, and generates scanning signals which make it possible to determine rotational angle Θ of the rotary table at any X-position of linear table 31. To that end, scanning unit 120 is secured on linear table 31.

The scanning beam path, i.e., the scanning optics of the angle-measuring device, is shown in FIGS. 8a and 8b. A stretched representation of the optical path is shown again in FIGS. 9a and 9b.

In contrast to the first example embodiment, scanning plate 124, i.e., scanning grating 123, is disposed outside of scanning unit 120. Therefore, in this exemplary embodiment, scanning unit 120 includes a light source and a plurality of optoelectronic detector elements, which are not shown in the figures.

As illustrated in FIGS. 6 and 7, at least one scanning unit 120 is displaceably disposed with respect to the scanning grating or scanning plate 124, and additionally, graduated disk 110 is rotatably disposed. In this case, graduated disk 110 is situated on rotary table 35, scanning unit 120 is situated on linear table 31, and scanning plate 124 having the scanning grating is located on stationary machine base 30.

Scanning plate 124 bears a reflective linear scanning grating 123 that is extended in moving direction X of linear table 31, that is, the longitudinal direction of the graduation lines extends along moving direction X of the linear table. The collimated beam of rays from the light source strikes in tilted fashion in the XZ-plane initially at location P1 on graduated disk 110. Graduated disk 110 transmits the beam of rays via location P2, so that it strikes at location P3 on reflective linear scanning grating 123, which splits it into two partial beams of rays and deviates them in the Y-direction. The partial beams of rays, displaced in the X-direction, reach first combined radial-circular grating 111.1 of graduated disk 110 at location P4a, P4b. It aligns both partial beams of rays in the YZ-plane parallel to optical axis Z again, and focuses them in the X-direction by a superposed cylindrical-lens effect onto locations P5a, P5b on a mirror 112 on the back side of graduated disk 110. After being reflected, the partial beams of rays arrive at locations P6a, P6b on second combined radial-circular graduation 111.2, which re-collimates them again by a cylindrical-lens effect in the X-direction, and by a superposed deviating effect in the YZ-plane, redirects them oppositely to the incident partial beams of rays. Both partial beams of rays thereby strike one common point P7 on reflective scanning grating 123, are superposed there, and exit as superposed partial beams of rays via locations P8a, P8b, P8c and P9a, P9b, P9c of scanning plate 124, in resulting zeroth and ±1st order of diffraction. The detection by optoelectronic detector elements in scanning unit 120 corresponds to the above-described example embodiment and is not depicted in the figures for this exemplary embodiment.

Figure 10A:
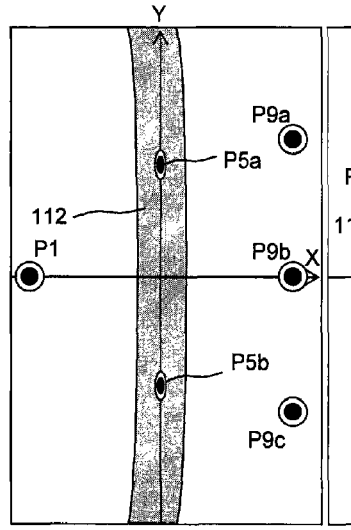
FIG. 10a is a partial view of the lower side of the graduated disk of the optical angle-measuring device illustrated in FIGS. 6 and 7, with the mirror disposed on it.
Figure 10B:
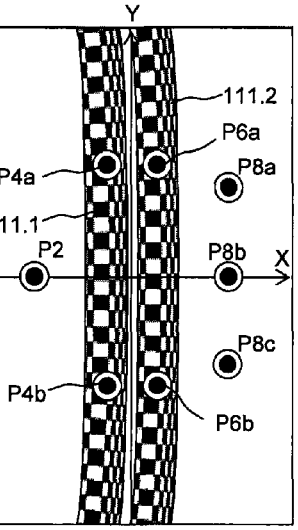
FIG. 10b is a partial view of the upper side of the graduated disk of the optical angle-measuring device illustrated in FIGS. 6 and 7, with the radial-circular gratings disposed on it.
Figure 10C:
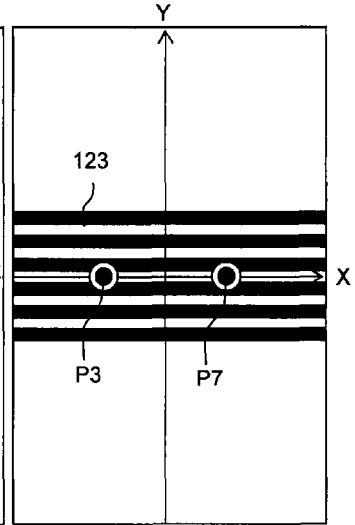
FIG. 10c is a partial view of the scanning gratings of the optical angle-measuring device illustrated in FIGS. 6 and 7.
Figure 11A:
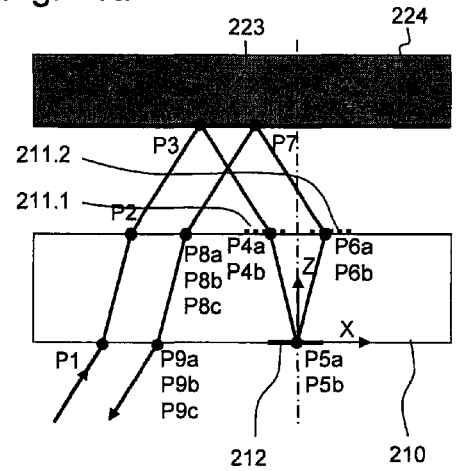
FIGS. 11a and 11b are sectional views having the scanning beam path of an optical angle-measuring device according an example embodiment of the present invention.
Figure 11B:
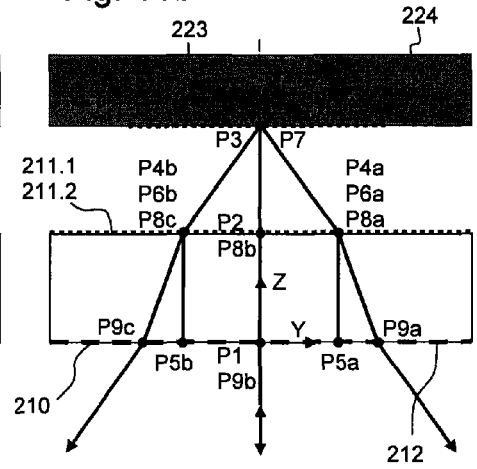
Figure 12A:
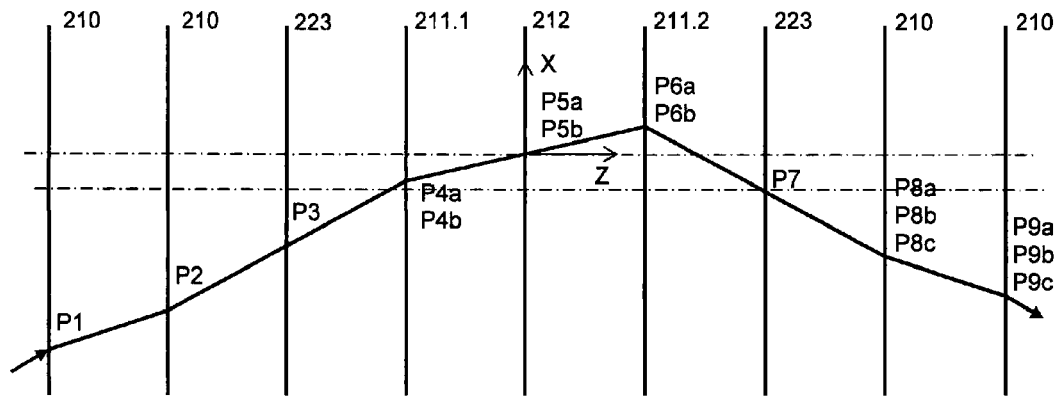
FIGS. 12a and 12b show the unfolded scanning beam path of the optical angle-measuring device illustrated in FIGS. 11a and 11b.
Figure 12B:
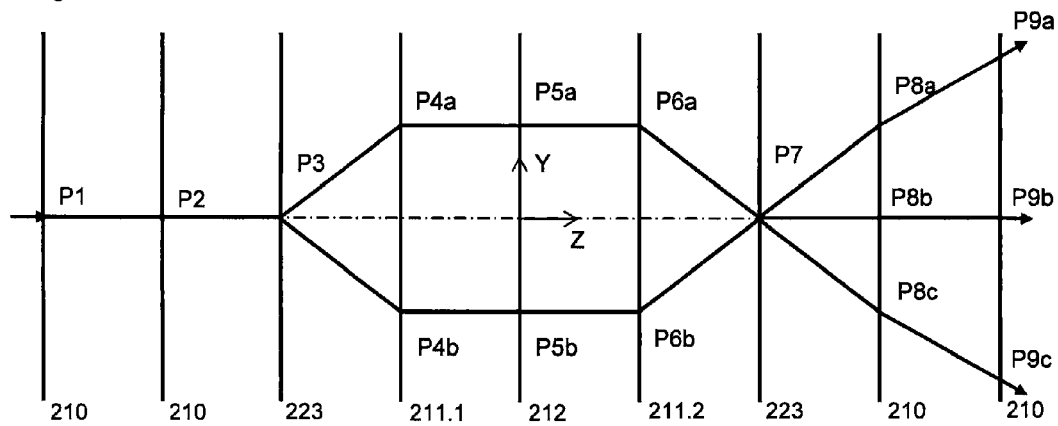
Figure 13A:
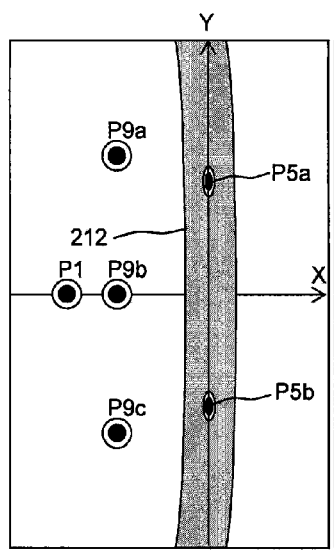
FIG. 13a is a partial view of the lower side of the graduated disk of the optical angle-measuring device illustrated in FIGS. 11a and 11b, with the mirror disposed on it.
Figure 13B:
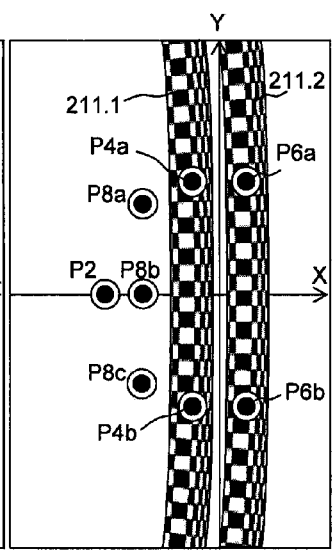
FIG. 13b is a partial view of the upper side of the graduated disk of the optical angle-measuring device illustrated in FIGS. 11a and 11b, with the radial-circular gratings disposed on it.
Figure 13C:
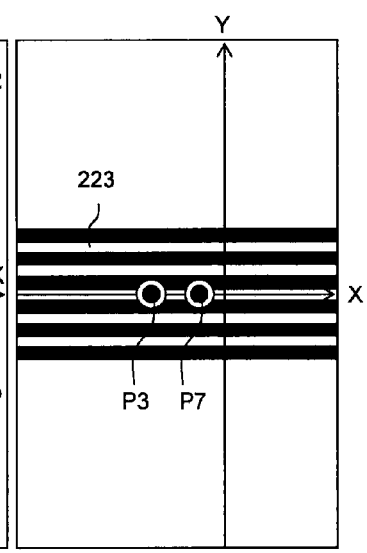
FIG. 13c is a partial view of the scanning gratings of the optical angle-measuring device illustrated in FIGS. 11a and 11b.

FIG. 10a shows the lower side of graduated disk 110 having annular mirror 112. FIG. 10b shows annular, combined radial-circular gratings 111.1 and 111.2. Extended, linear scanning grating 123 of scanning plate 124 is seen in FIG. 10c. The locations at which the partial beams of rays strike the various elements in the scanning beam path are again shown in these figures, as well.

Due to the tilt of the collimated laser beam of rays in the XZ-plane, in this example embodiment of the angle-measuring device, a separation of the partial beams of rays striking graduated disk 110 is achieved, so that a transmission of the partial beams of rays takes place at locations P2, P8a, P8b and P8c, and a diffraction takes place at gratings 111.2 and 111.2 at locations P4a, P4b, P6a and P6b. Because of this beam tilt, the lateral component of the k-vector must be taken into account when calculating the grating structure of gratings 111.1 and 111.2 according to the equations indicated above. It leads to a corresponding, adapted, azimuthal grating vector $k_{A1a}$ and radial grating vector $kA1r$. The beam tilt in the XZ-plane is retained in the further optical path after second combined radial-circular grating 110.2. Azimuthal grating vector $k_{A2a}$ and radial grating vector $k_{A1r}$ are selected accordingly for that purpose.

These scanning optics allow the measurement of angle Θ at any X-position of linear table 31. The position of scanning unit 120 must only be kept approximately below the predetermined point of intersection of scanning plate 124 and graduated disk 110. Small displacements or tiltings of scanning unit 120 do not influence the angle determination. On closer examination, it is decisive for this feature, that the retroreflection and the wave-front correction do not take place in the scanning unit, but rather are brought about by the radial-circular gratings on the graduated disk. Therefore, only the relative position of scanning plate 124 and graduated disk 110 is relevant for the angular value output. Even though a superposed linear motion and rotary motion of graduated disk 110 exists, a direct position measurement relative to stationary scanning plate 124 may be implemented. Measuring circle 40 indicated schematically in FIG. 7 is correspondingly small. A small measuring circle 40 permits an especially low-drift measurement of object 33 relative to sensor 32.

FIGS. 11a, 11b, 12a, 12b, 13a, 13b, and 13c show a third example embodiment of the optical angle-measuring device. This variant may likewise again be used in the polar-coordinate kinematics mentioned above.

In contrast to the second example embodiment, the beam tilt of the partial beams of rays in the XZ-plane is reversed by the special form of second combined radial-circular grating 210.2, so that the two partial beams of rays are subsequently tilted somewhat in the −X-direction. In this manner, due to the tighter spacing, the light source and the detector elements may be accommodated compactly in the scanning unit. The special form of second combined radial-circular grating 210.2 is provided by a corresponding grating vector in the X-direction, which is split into an azimuthal component and a radial component, and in each case is added to azimuthal grating vector $k_{A2a}$ and to radial grating vector $k_{A2r}$, respectively.

Figure 14:
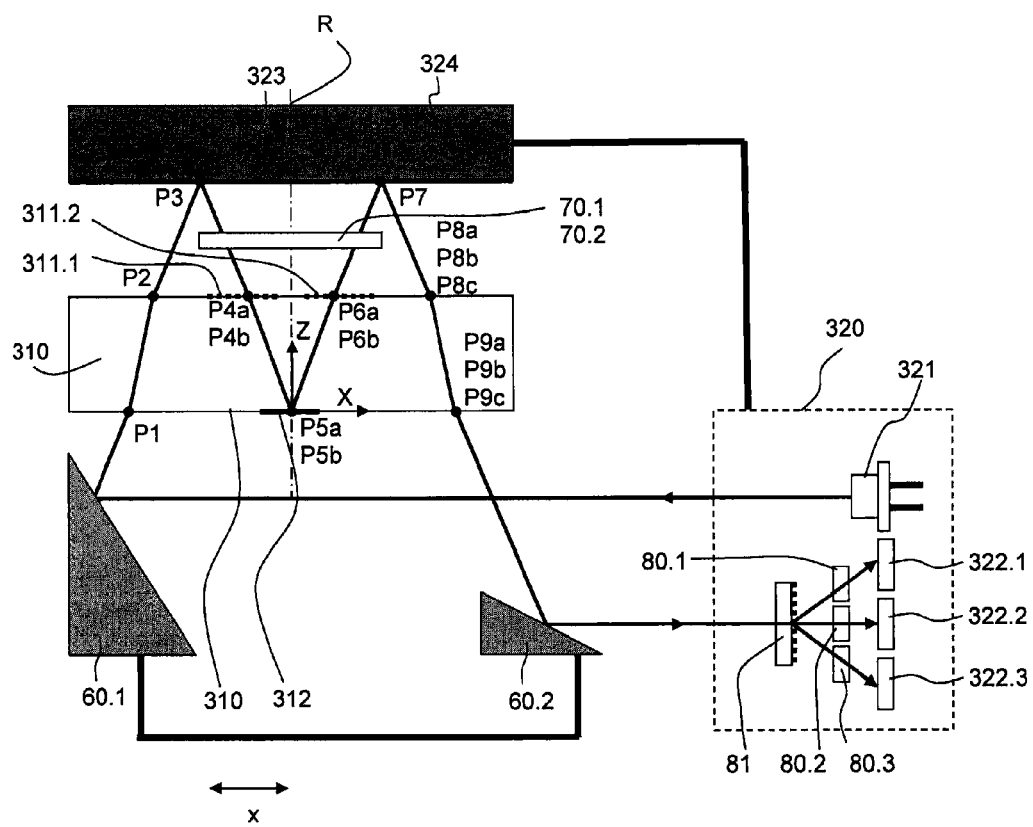
FIGS. 14 and 15 are sectional views illustrating the scanning beam path of an optical angle-measuring device according to an example embodiment of the present invention.
Figure 15:
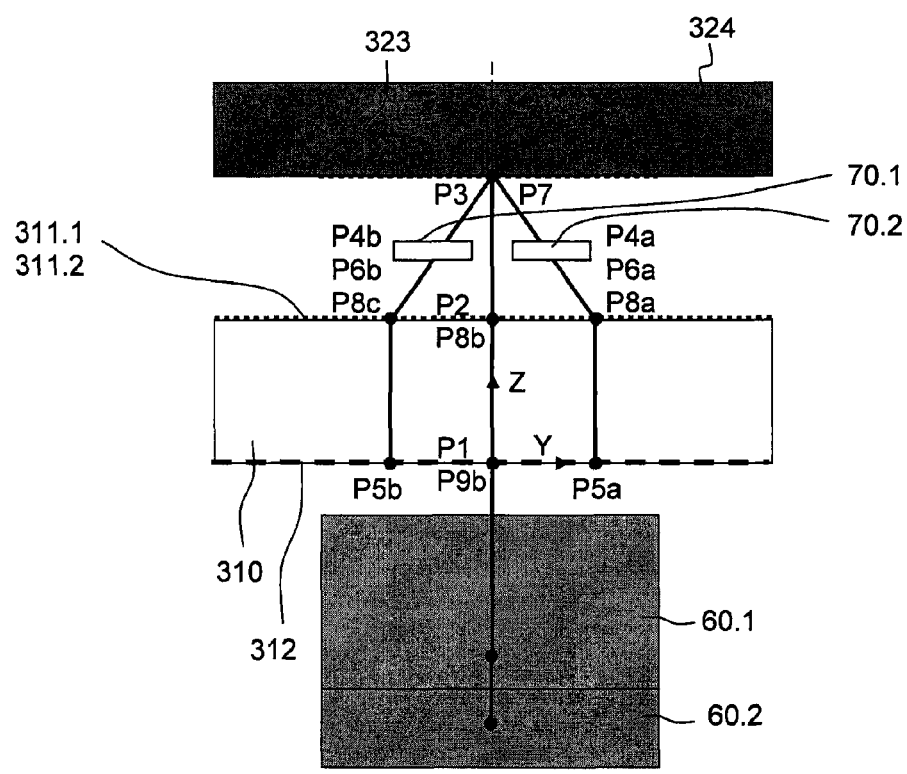

A fourth example embodiment of the optical angle-measuring device, i.e., the scanning beam path, is shown schematically in FIGS. 14 and 15. This arrangement is suitable for use in a machine having polar-coordinate kinematics.

The distinguishing feature of this example embodiment is in fixedly disposed scanning unit 320, which includes linearly polarized and collimated light source 321, as well as detector elements 322.1, 322.2 and 322.3. The linearly polarized beam of rays from the light source is sent, counter to the X-direction, to a first reflecting mirror 60.1 of a deviating unit, where it is directed by reflection to graduated disk 310. In the further optical path, the beam of rays is split at a reflective scanning grating 323 into two partial beams of rays, which subsequently pass through λ/8-delay plates 70.1 and 70.2, respectively. After the diffraction at first radial-circular grating 311.1, the reflection at mirror 312 and the diffraction at second radial-circular grating 311.2, λ/8-delay plates 70.1 and 70.2 are each traversed once more. In this manner, the linear polarization of the partial beams of rays is converted into a right-circular and left-circular polarization. The second diffraction at reflective scanning grating 323 superposes the partial beams of rays, polarized orthogonally relative to each other, to form one resulting beam of rays that exits in the resultant zeroth order of diffraction. It is directed parallel to the X-axis by second reflecting mirror 60.2 of the deviating unit, and propagates in the direction of scanning unit 320. Located in scanning unit 320 is a splitting grating 81, which splits the resultant beam of rays into three resulting partial beams of rays. They each pass through a polarizer 80.1, 80.2 and 80.3, respectively. These are oriented differently such that the subsequent detection by detector elements 322.1, 322.2, and 322.3 supplies three scanning signals phase-shifted by 120° relative to each other.

As already mentioned, both the two reflecting mirrors 60.1 and 60.2, which act as a deviating unit for the beams of rays falling on them in each case, and λ/8-delay plates 70.1 and 70.2 are disposed on the linear table, and are displaceable in the indicated X-direction via the linear table. Consequently, a consistent optical path is ensured, regardless of the X-position of the linear table. Since scanning unit 320 may generate considerable power dissipations, the spatially remote placement minimizes the thermal stress of the critical components, especially graduated disk 310 and scanning plate 324. The measuring accuracy may thereby be increased, and the drift of the output position values decreases considerably.

Therefore, in the present exemplary embodiment, graduated disk 310 is disposed in a manner allowing movement relative to stationary scanning unit 320 and stationary scanning plate 324, i.e., the scanning grating situated on it. In this context, the scanning grating and scanning unit 320 are movable with respect to graduated disk 310 along an axis which extends through the center of graduated disk 310. To that end, graduated disk 310 is disposed circumference-wise on the rotary table of the machine, the rotary table being rotatable about axis of rotation R, whereas scanning unit 320 and the scanning grating or scanning plate 324 are disposed on the stationary machine base.

In further modifications of this example embodiment of the optical angle-measuring device, other polarization-optical components may also be inserted into the beam path of the partial beams of rays, in order to attain an orthogonal, linear or circular polarization. Accordingly, for one skilled in the art, there are also other arrangements of polarization-optical components in scanning unit 320, in order to convert the resultant beam of rays into displacement-dependent, phase-shifted scanning signals.

Figure 16:
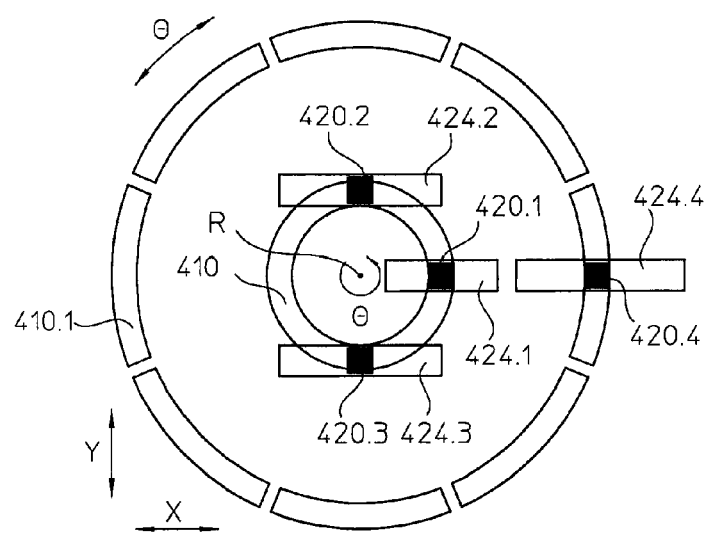
FIGS. 16 and 17 illustrate a measuring system having an optical angle-measuring device according to an example embodiment of the present invention.
Figure 17:
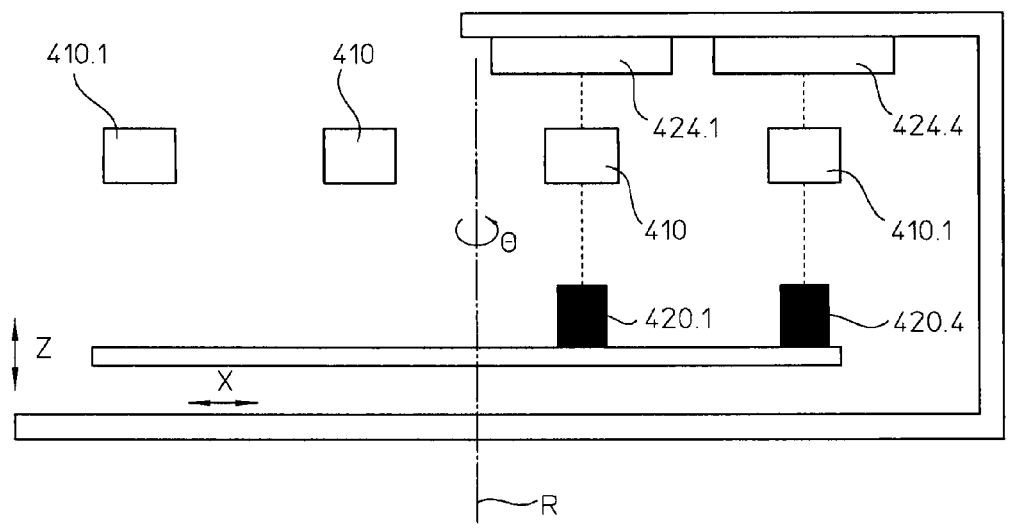

A fifth example embodiment of the optical angle-measuring device is schematically illustrated in FIGS. 16 and 17. This example embodiment is also suitable for use in a machine having polar-coordinate kinematics.

The corresponding machine again includes a rotary table which is rotatable about axis of rotation R and is disposed on a linear table in a manner allowing displacement along the X-direction. Situated in an inner area of the rotary table is an inner first graduated disk 410, which is scanned with the aid of three scanning plates 424.1, 424.2 and 424.3 and three scanning units 420.1, 420.2 and 420.3 assigned to them. Scanning plates 424.1, 424.2, 424.3 and scanning units 420.1, 420.2, 420.3 are placed at various azimuthal positions relative to graduated disk 410. Scanning plates 424.1, 424.2, 424.3 are joined to the stationary machine base, whereas scanning units 420.1, 420.2, 420.3 are disposed on the linear table displaceable in the X-direction. In addition, mounted at the outer periphery of the rotary table is an outer second graduated disk 410.1 which is subdivided into a plurality of graduated-disk segments and whose movement is ascertained via additional scanning plate 424.4 and additional scanning unit 420.4. Scanning plate 424.4 is again joined to the stationary machine base, and scanning unit 420.4 is situated on the linear table.

All four scanning units 420.1 to 420.4 deliver position signals which are a function of rotational angle Θ of the rotary table. However, upon more careful examination, in each case, linear displacements of graduated disk 410 and 410.1, respectively, parallel to the azimuthal direction, relative to scanning plates 424.1, 424.2, 424.3 and 424.4 are also measured by a scanning unit 420.1 to 420.4. That is to say, all degrees of freedom of the moved object in the XY-plane are able to be ascertained via this configuration.

If the positive measuring directions of scanning units 420.2 and 420.3 point in the +X-direction, and those of scanning units 420.1 and 420.4 point in the +Y-direction, then the following equations are obtained for associated scanning signals $\xi_2$ and $\xi_3$ or $\xi_1$ and $\xi_4$:

$$\Delta\xi_1 = \Delta y + R_1 \cdot \Delta\Theta \quad \text{(equation 13.1)}$$

$$\Delta\xi_2 = \Delta x - R_1 \cdot \Delta\Theta \quad \text{(equation 13.2)}$$

$$\Delta\xi_3 = \Delta x + R_1 \cdot \Delta\Theta \quad \text{(equation 13.3)}$$

$$\Delta\xi_4 = \Delta y + R_2 \cdot \Delta\Theta \quad \text{(equation 13.4)}$$

where:

$R_1$ represents the graduation radius of inner graduated disk 410; and $R_2$ represents the graduation radius of outer graduated disk 410.1;

From this, it is possible to determine angle ΔΘ and displacements Δx and Δy of the rotary-table center:

$$\Delta\Theta = \frac{\Delta\xi_4 - \Delta\xi_1}{R_2 - R_1} \quad \text{(equation 14.1)}$$

$$\Delta x = \frac{\Delta\xi_2 - \Delta\xi_3}{2} \quad \text{(equation 14.2)}$$

$$\Delta y = \frac{\Delta\xi_1 \cdot R_2 + \Delta\xi_4 \cdot R_1}{R_2 - R_1} \quad \text{(equation 14.3)}$$

A transformation of these table displacements of the rotary-table center to those at the location of a sensor of the machine is readily possible. Therefore, in principle, all lateral degrees of freedom Δx, Δy and ΔΘ of one or more objects on the rotary table relative to the sensor may be determined via this configuration. Moreover, if scanning units 420.1, 420.2, 420.3 and 420.4 are implemented so that in each case, a displacement perpendicular to the XY-plane, i.e., in the Z-direction, may also be measured at the point of intersection of associated scanning plate 424.1, 424.2, 424.3 or 424.4 with graduated disk 410 or 410.1, then all 6 degrees of freedom of the respective object are measurable relative to a stationary sensor.

As mentioned above, this measurement does not take place sequentially from the stationary machine base to the linear table and then from the linear table to the rotary table. Rather, the configuration of the angle-measuring device described herein permits a direct measurement or position determination. Suitable measuring devices for the Z-displacement include optical sensors such as plane-mirror interferometers and focus sensors. Alternatively, capacitive measuring devices are also suitable for measuring distance in the Z-direction.

In this exemplary embodiment, four scanning units 420.1, 420.2, 420.3 and 420.4 are provided for measuring three lateral degrees of freedom. There is thus one redundant scanning unit. It is thereby possible to permit small breaks in outer graduated disk 410.1, and to construct it from a plurality of graduated-disk segments. Segmentation of outer graduated disk 410.1 is considered advantageous because the segments are considerably lighter due to their limited size, and are less expensive to produce than a one-piece, large graduated disk, for instance. The segment boundaries, and therefore the signal interruptions, may take place at the locations at which sensor 432 stands between two objects on the rotary table. In each case, the incremental counter of scanning unit 420.4 becomes invalid there. If the next segment of graduated disk 410.1 is rotated into the area of outer scanning unit 420.4, then with the aid of the lateral position-determination of the other three scanning units 420.1, 420.2 and 420.3, the incremental counter value of outer scanning unit 420.4 may be estimated with sufficient accuracy and set accordingly, as well. For further increases in accuracy, even smaller phase offsets between the segments of outer graduated disk 410.1 may be ascertained and corrected.

Figure 18:
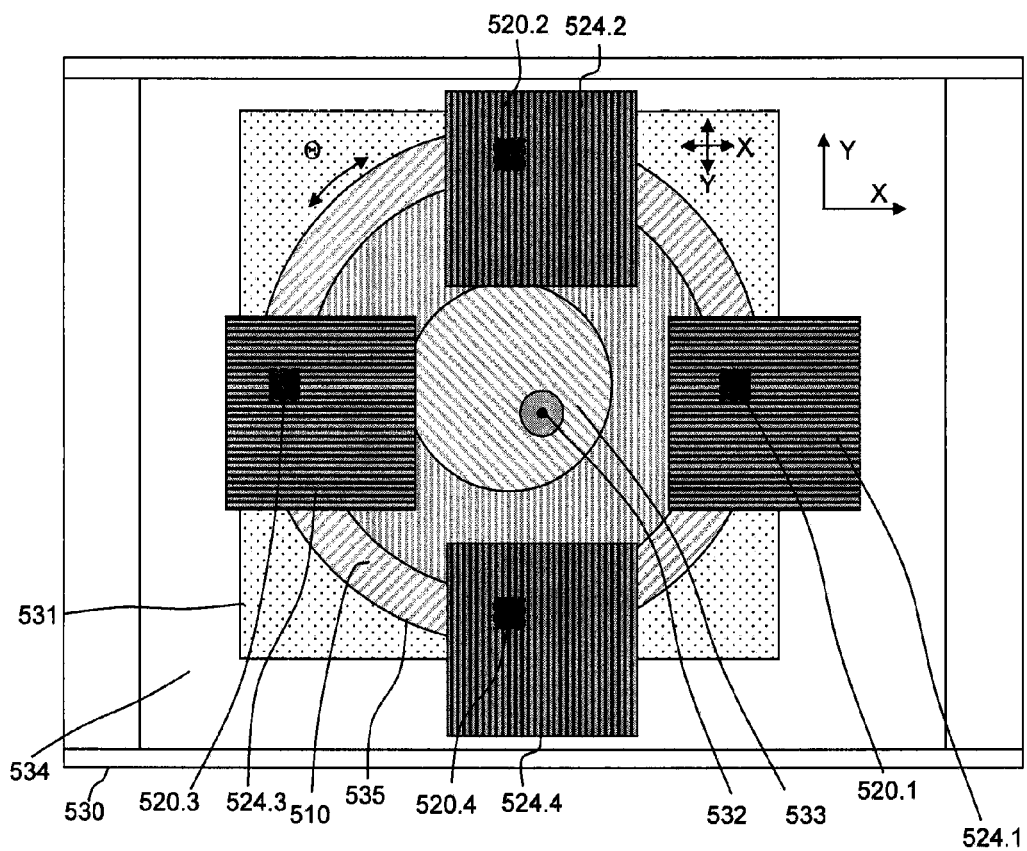
FIGS. 18 and 19 illustrate a further machine having polar-coordinate kinematics, in an optical angle-measuring device according to an example embodiment of the present invention may be used.
Figure 19:
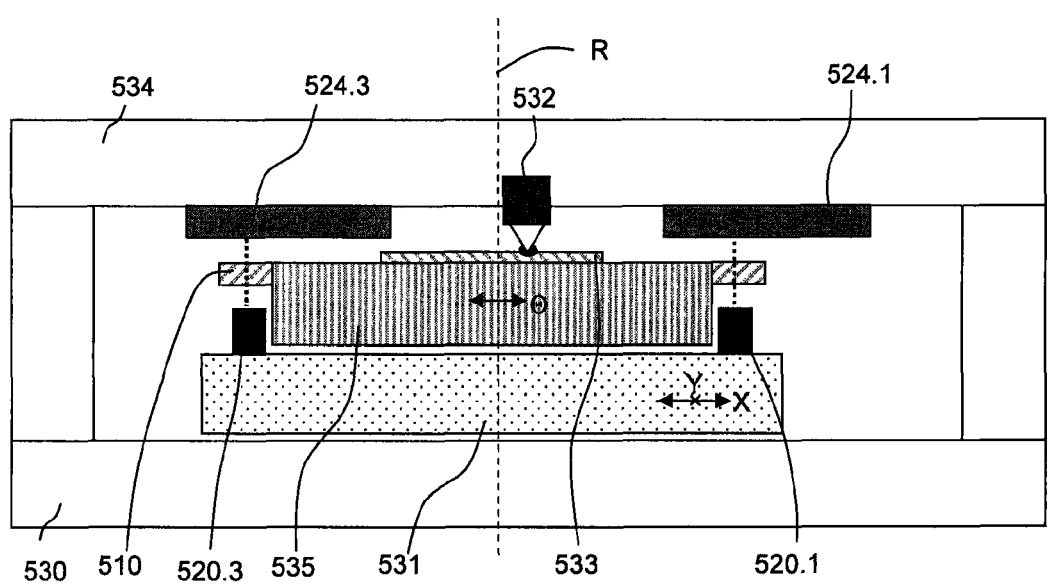

FIGS. 18 and 19 show a sixth example embodiment of the optical angle-measuring device. It is again intended for use in a machine having polar-coordinate kinematics.

A graduated disk 510 is scanned by four scanning units 520.1, 520.2, 520.3 and 520.4 and associated stationary scanning plates 524.1, 524.2, 524.3 and 524.4. Scanning plates 524.1, 524.2, 524.3 and 524.4 are again in the form of linear gratings, but now also with so great an extension in the azimuthal direction that an appreciable displacement of the scanning location is possible in even this direction, as well. It is thereby also possible to use a rotary table 531 that is displaceable both in the X-direction and in the Y-direction. Scanning units 520.1, 520.2, 520.3 and 520.4 are secured on table 531.

This example embodiment of the optical angle-measuring device allows a measurement in all lateral degrees of freedom X, Y and Θ, with the particular feature that very large displacements in all these degrees of freedom are possible, as well. If, in addition, scanning units 520.1, 520.2, 520.3 and 520.4 each again include a measuring device for the Z-displacement, then all six degrees of freedom of rotary table 531 are determinable relative to stationary scanning plates 524.1, 524.2, 524.3 and 524.4.

In further modifications of the optical angle-measuring device, cross gratings, i.e., two-dimensional graduations, may also be used as scanning gratings. Consequently, especially great linear or perhaps planar displacements of the rotary table may be ascertained. It is also possible to provide only one suitably large cross grating as scanning grating in common for all scanning units. Moreover, the azimuthal position of the scanning units on the graduated disk may be selected as needed and independently of the moving direction(s) of the linear or XY-table in a machine having polar-coordinate kinematics. In this case, the orientation of the scanning grating must agree with the azimuthal direction at the scanning location.

Furthermore, it is possible to form the two combined radial-circular gratings as reflection gratings on the lower side of the graduated disk, and the mirror on its upper side. The optical path within the graduated disk thereby becomes W-shaped, etc.

What claimed is:

1. An optical angle-measurement device adapted to ascertain a relative movement between the scanning grating and the graduated disk device, comprising:
   at least one scanning grating arranged as a linear scanning grating;
   a graduated disk including a first and a second combined radial-circular grating as a measurement graduation and a mirror; and
   wherein the scanning grating is adapted to initially split an incident beam of rays into two partial beams of rays that propagate in a direction of the first combined radial-circular grating;
   wherein the first combined radial circular grating is adapted to diffract the partial beams of rays so that the diffracted partial beams of rays propagate in a direction of the mirror;
   wherein the minor is adapted to reflect the partial beams of rays in a direction of the second combined radial-circular grating so that the partial beams of rays propagate in a direction of the second combined radial-circular grating;
   wherein the second combined radial-circular grating is adapted to diffract the partial beams of rays so that diffracted partial beams of rays propagate in a direction of the scanning grating; and wherein the scanning grating is adapted to superpose the partial beams of rays.

2. The optical angle-measurement device according to claim 1, wherein the combined first and second radial-circular gratings are adapted to unite at least an azimuthal, optical deviating effect with an optical effect of a radial, annularly curved cylindrical lens.

3. The optical angle-measurement device according to claim 1, wherein the first combined radial-circular grating is adapted for a longitudinal and a transverse deviating effect on the partial beams of rays and to focus the partial beams of rays onto the mirror.

4. The optical angle-measurement device according to claim 1, wherein the second combined radial-circular grating is adapted for a longitudinal and a transverse deviating effect on the partial beams of rays and to re-collimate the partial beams of rays propagating in a direction of the scanning grating.

5. The optical angle-measurement device according to claim 1, wherein the combined first and second radial-circular gratings are arranged in a ring shape over a circumference of the graduated disk, and in each case have a constant azimuthal grating period over a ring circumference, and a varying radial grating period in a radial direction.

6. The optical angle-measurement device according to claim 1, wherein the mirror is arranged in a ring shape over a circumference of the graduated disk.

7. The optical angle-measurement device according to claim 5, wherein the graduated disk is made of transparent material, and the combined first and second radial-circular gratings are arranged on a first side, and on an opposite second side, the mirror is arranged with a reflecting surface oriented in a direction of the first side.

8. The optical angle-measurement device according to claim 1, wherein the scanning grating is arranged in the form of a reflective scanning grating.

9. The optical angle-measurement device according to claim 1, further comprising a light source adapted to emit a beam of rays routable to the scanning grating and a plurality of optoelectronic detector elements disposed in a scanning unit, the superposed partial beams of rays being routable to the optoelectronic detector elements.

10. The optical angle-measurement device according to claim 9, wherein the scanning grating is arranged in the scanning unit, and the graduated disk is movably arranged relative to the scanning unit.

11. The optical angle-measurement device according to claim 9, wherein at least one scanning unit is displaceably disposed relative to the scanning grating, and the graduated disk is rotatable.

12. The optical angle-measurement device according to claim 9, wherein at least one scanning unit, together with the scanning grating, is movable relative to the graduated disk along an axis that extends through a center of the graduated disk.

13. The optical angle-measurement device according to claim 9, further comprising a plurality of scanning units and a plurality of scanning gratings assigned to the scanning units, wherein the scanning units and the scanning gratings are arranged at various azimuthal positions relative to the graduated disk.

14. The optical angle-measurement device according to claim 9, wherein the graduated disk includes a plurality of graduated-disk segments.

15. The optical angle-measurement device according to claim 9, further comprising a deviation unit adapted to guide the beams of rays from the scanning unit in a direction of the graduated disk and to guide the beams of rays from the graduated disk in a direction of the scanning unit.

* * * * *